United States Patent [19]

Frye

[11] 4,335,753

[45] Jun. 22, 1982

[54] HOSE CONNECTORS AND HOSES EQUIPPED WITH SAME

[76] Inventor: Richard D. Frye, 900 Lime La., Marathon, Fla. 33050

[21] Appl. No.: 148,581

[22] Filed: May 9, 1980

[51] Int. Cl.³ .......................................... F16L 33/20
[52] U.S. Cl. .................................. 138/109; 285/256; 285/258
[58] Field of Search ............... 138/109, 178; 285/256, 285/258, 149; 29/507, 523

[56] References Cited

U.S. PATENT DOCUMENTS

| | | | |
|---|---|---|---|
| 1,388,622 | 8/1921 | Voorhees | 138/96 T |
| 1,594,997 | 8/1926 | Bulley | 285/256 |
| 2,258,919 | 10/1941 | Wallace | 285/258 X |
| 2,700,988 | 2/1955 | Smisko | 138/109 X |
| 2,902,299 | 9/1959 | Turner | 285/258 |
| 2,908,512 | 10/1959 | Morrow | 285/256 X |
| 3,549,180 | 12/1970 | MacWilliam | 285/256 |

*Primary Examiner*—James E. Bryant, III
*Attorney, Agent, or Firm*—Roylance, Abrams, Berdo & Farley

[57] ABSTRACT

Male threaded hose connectors in the form of an integral sheet metal piece, and hose equipped therewith. The male threaded portion of the connector surrounds the hose and includes rolled sheet metal threads embedded in the hose material.

4 Claims, 7 Drawing Figures

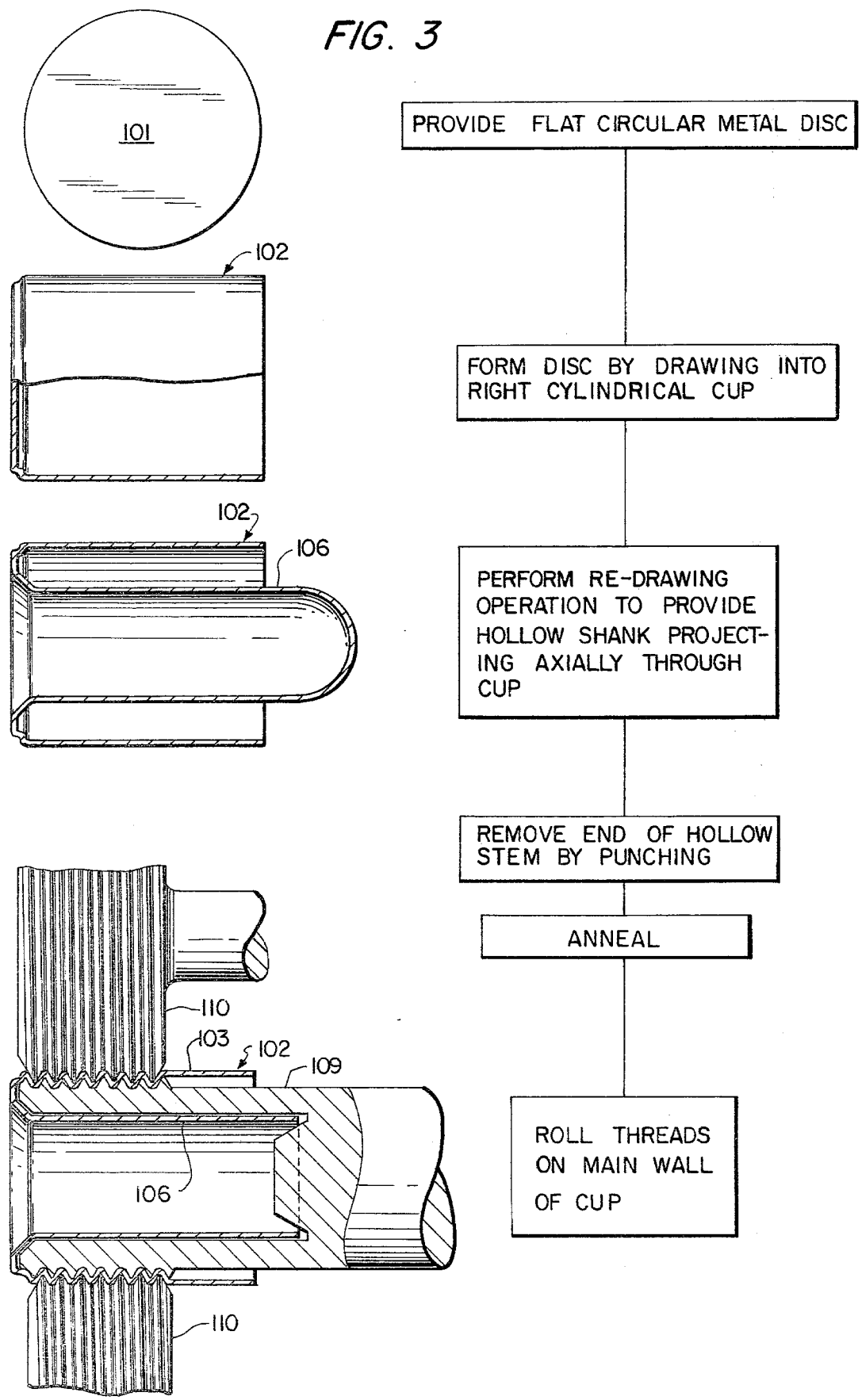

BEND FREE EDGE OF CUP INWARDLY UPON ITSELF

INSERT HOSE AND EXPAND CENTRAL STEM TO COMPRESS HOSE END IN COUPLING MEMBER AS IN FIG. 1A

HOSE CONNECTORS AND HOSES EQUIPPED WITH SAME

BACKGROUND OF THE INVENTION

It is very old to equip hoses, typically garden hoses and hoses for household appliances and the like, with threaded connectors. Facing a continuing demand for economy and mass production, the hose connector industry has simplified threaded connectors and adopted advanced metal forming techniques. Thus, it has become common to make threaded hose connectors of thin metal, with the hose end clamped between a hollow inner stem, from which the threaded element projects axially, and a separate outer sleeve, as seen in U.S. Pat. Nos. 2,338,666 Nelson, 2,623,837 Butler, 3,220,753 Kasidas.

It has also been proposed, in heavier connectors, to make the outer sleeve integral with the threaded element, as seen in U.S. Pat. Nos. 2,147,355 Scholtes, 2,268,088 Scholtes.

Despite much success in the trade, there has been a continuing demand for simplification, functional improvement, and lower cost.

OBJECTS OF THE INVENTION

A general object is to provide a male threaded hose connector which is simpler and less costly than those of the prior art.

Another object is to devise an improved method for manufacturing such connectors and applying them to the hose.

A further object is to provide an improved hose-and-hose connector combination.

Yet another object is to devise a male threaded connector formed from sheet metal as an integral piece.

SUMMARY OF THE INVENTION

Hose connectors according to the invention comprise an outer sleeve, a transverse annular end wall extending inwardly from one end of the sleeve, and a tubular stem extending axially from the end wall through the sleeve, the sleeve, end wall and stem being integral, the sleeve being formed throughout a major portion of its length with rolled threads, and the connector being applied to the hose by inserting an end of the hose between the sleeve and stem and expanding the stem to compress and clamp the hose between the stem and sleeve with the material of the hose filling the inner spaces of the rolled threads.

Hose connectors according to the invention are produced by providing a flat circular sheet metal blank, drawing the blank into a cup, performing a second drawing operation on the bottom of the cup to provide a tubular stem, and rolling the threads on the outer wall of the cup, which becomes the sleeve of the connector, the sheet metal of the original blank being sufficiently thin to allow the thin metal wall of the sleeve to follow the configuration of the threads so that the threaded portion presents external male threads and an inner surface in the form of female threads. When the second drawing operation has been done, the closed end of the stem is removed, advantageously by punching. The free end portion of the sleeve is bent back upon itself before or after the threads have been formed. The hose end is inserted between the stem and the threaded sleeve, and the stem then expanded to complete the assembly. When the wall thickness of the hose is inadequate, the end of the hose is turned back upon itself to provide at least a double thickness for insertion into the connector. The second drawing operation can include a first step which forms the hollow stem as an axial projection extending away from the cup, the threads then being rolled, and the drawing operation then being completed by a reverse draw. In other embodiments, the stem is drawn directly into the interior of the cup, and the threads then rolled, using a hollow arbor.

IDENTIFICATION OF THE DRAWINGS

In order that the manner in which the foregoing and other objects are achieved according to the invention can be understood in detail, particularly advantageous embodiments thereof will be described with reference to the accompanying drawings, which form part of the original disclosure of this application, and wherein:

FIGS. 1 and 1A present a flow sheet of one method for making hose connectors according to the invention and include illustrations of the connector member at various stages of its manufacture and application to the hose;

FIG. 2 is a longitudinal sectional view of the hose-and-hose connector according to FIG. 1 coupled to a double female threaded adaptor;

FIGS. 3 and 3A present a flow sheet illustrating another method for making hose connectors according to the invention; and FIGS. 4 and 5 are longitudinal sectional views of hose-and-hose connector combinations according to additional embodiments.

DETAILED DESCRIPTION OF THE INVENTION

Figure 1:
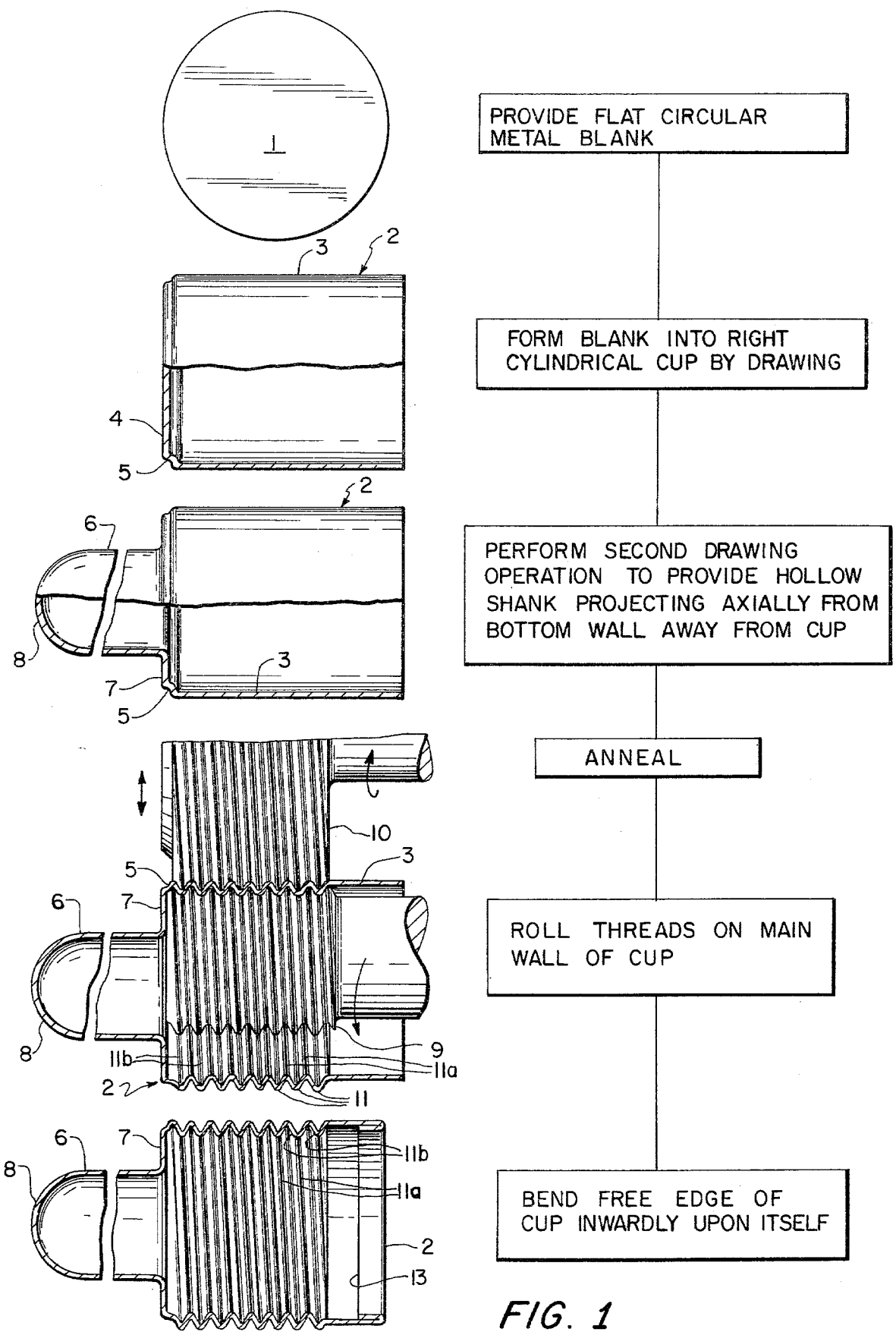
Figure 1A:
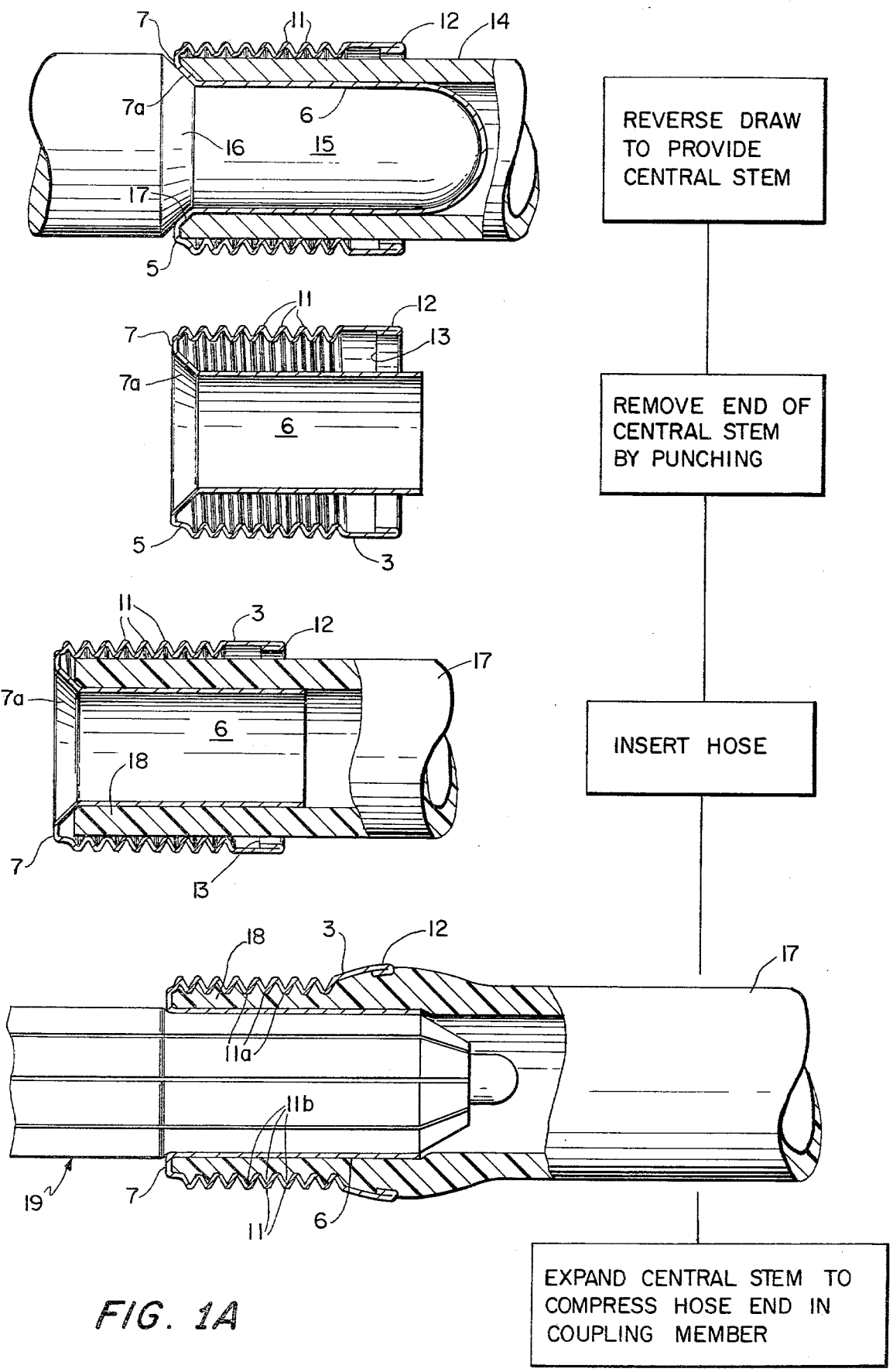

The invention will best be understood if the methods for making the hose connectors are first described commencing with that of FIGS. 1 and 1A. The method commences with provision of a flat circular blank 1 of sheet metal, typically by stamping the blank from brass sheet 0.015–0.035 in. (0.38–0.89 mm.) thick. Alternatively, blank 1 can be of copper, bronze, alumiunum or steel. The blank 1 is first formed by a conventional drawing operation into the shape of a cup 2 having a right cylindrical side wall 3 and a transverse or bottom wall 4, the outer diameter of the side wall being reduced at 5 to a dimension capable of being embraced by the female connector member (not shown) with which the male member being made is to mate. The cup is then subjected to a second drawing operation to form a closed protrusion 6 projecting away from the cup, protrusion 6 being centered on the bottom wall so that a flat annular outer portion 7 of the bottom wall remains. This step is accomplished by conventional sheet metal drawing techniques using, e.g., an annular die and a plunger with a rounded nose, so that the free end of protrusion 6 is closed by rounded end wall 8. The resulting article is then annealed. After annealing, a major portion of the length of side wall 3 is threaded, using a rotating threading mandrel 9 and a cooperating threading roller 10. The resulting rolled threads extend from adjacent annular end wall 7 to a location near but spaced significantly from the free end of wall 3. Formed by conventionally rolling the sheet metal of wall 3, the threads 11 are complete convolutions, so that the outer surface of the threaded portion constitutes male threads while the inner surface has the configuration of a set of female threads and therefore presents inwardly directed crests 11a and inwardly opening spaces 11b between adjacent crests. The unthreaded free end portion of wall 3 is then bent inwardly and back upon itself to provide an annularly reinforced end 12 presenting a shoulder 13 facing toward end wall 7. Using a hollow die 14 and a plunger 15, the position of protrusion 6 is now reversed by reverse drawing, yielding an article in which protrusion 6 projects from end wall 7 completely through the space enclosed by wall 3, portion 6 and wall 3 being concentric and spaced apart. Plunger 15 has a transverse annular shoulder 16, and die 14 has a cooperating annular face 17 so that, as the reverse draw is completed, the inner portion 7a of end wall 7 is deflected into frustoconical form, tapering toward the free end of the plunger. The end of portion 6 is now removed, as by punching, to complete the connector member. In the resulting connector member, wall 3 can be considered as a threaded outer sleeve, and portion 6 as a central stem. Since, in this embodiment, the outer diameter of side wall 3 was reduced at 5, no portion of the side wall between threads 11 and end wall 7 has an outer diameter large enough to interfere with application of a female connector, such as the female connector of an adaptor as hereinafter described with reference to FIG. 2.

To apply the connector member to the hose 17, an end portion 18 of the hose is inserted into the annular space between stem 6 and outer sleeve 3 until the tip of end portion 8 is adjacent wall 7. An expanding tool 19 is then inserted in collapsed form through stem 6, the tool then expanded to enlarge the diameter of stem 6 and thus compress the end portion 18 of the hose between stem 6 and sleeve 3, and the tool then contracted and withdrawn. Typically, stem 6 is expanded enough to partially or totally eliminate frustoconical wall portion 7a, so the stem then extends with constant diameter from near the end wall 7 to the free end of the stem.

Hose 17 can be of any suitable flexible hose material which is adequately deformably under pressure to allow stem 6 to be expanded radially and to cause the material of the hose wall to firmly engage in the spaces presented by the rolled threads. Hose materials based on truly elastomeric materials, such as the natural and synthetic rubbers, are suitable, as are the so-called thermoplastic elastomers, such as styrene/elastomer block copolymers, including the styrene/butadiene copolymers and styrene/isoprene copolymers, the urethane block copolymers, and the polyolefin blends. Also useful are polymeric hose materials which, though less compressible than elastomeric materials, are characterized by good flexibility and the capability of cold flow.

Expansion of stem 6 applies a strong clamping force on the end portion 18 of the hose and causes the material of the hose wall to enter and at least partially fill the spaces 11b of the rolled threads so that, in effect the inner crests 11a of the threads become embedded in the hose material, locking the connector against being pulled off the hose. The hose material is also forced outwardly against the unthreaded free end portion of the sleeve, so as to cause the inner portion of reinforcing end 12 to be embedded in the hose material, with shoulder 13 completely or partially engaged in the hose.

Figure 2:
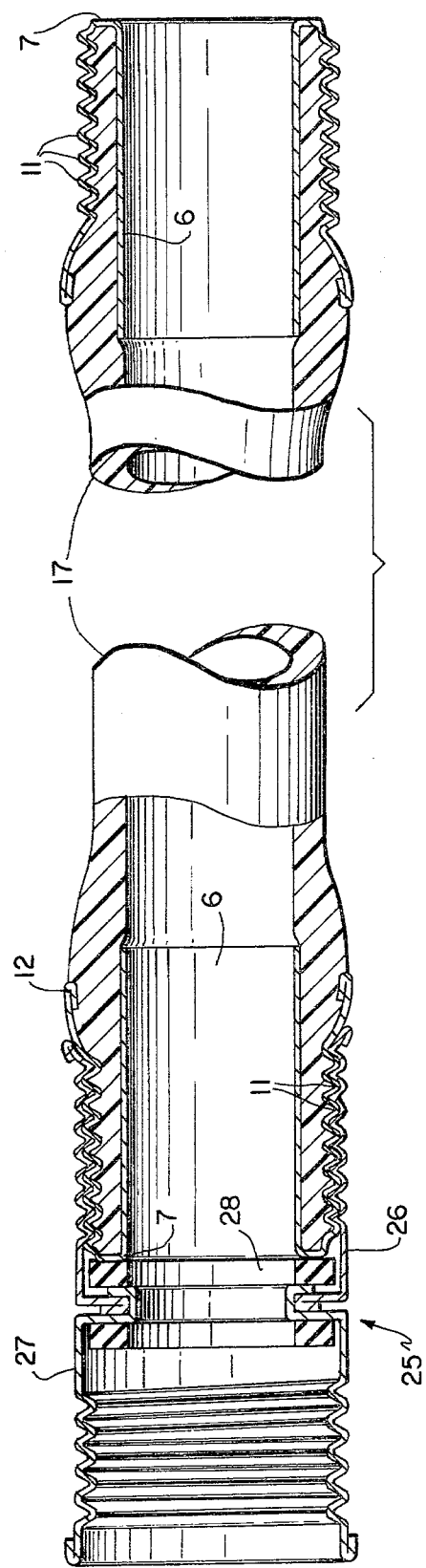

As seen in FIG. 2, the male hose connector produced and applied to the hose in the manner just described can be used in conjunction with an adaptor, such as that indicated generally at 25, the adaptor comprising a threaded female connector member 26, to engage the threads 11 of the male connector, and a second threaded female connector member 27 swivelled to member 26 and capable of being attached to, e.g., a sill cock or to a second male connector (not shown). It will be noted that female connector 26 can be equipped with a sealing washer 28, with end wall 7 of the male connector then engaging the washer. A particularly inexpensive garden hose, for example, can be produced by applying to the remaining end of hose 17 a second male connector made according to FIGS. 1 and 1A, the two male connectors being identical so that adaptor 25 can be applied to either end of the hose.

Figure 3A:
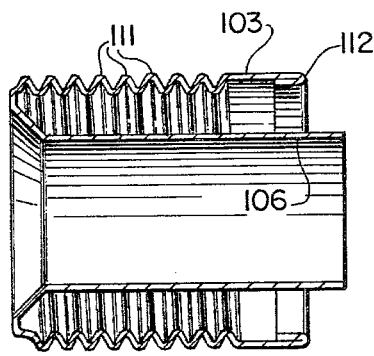

As seen in the flow sheet of FIGS. 3 and 3A, male connector members according to the invention can be made according to a second method, again commencing with a flat circular sheet metal blank 101 and again drawing that blank into the form of a cup 102. In this embodiment, the axial hollow stem 106 is then formed, by a reverse draw, so that when first formed stem 106 extends axially through the cup 102. The closed end of the stem is then punched out and the article annealed. After annealing, threads are rolled on the side wall 103 of the cup, using a hollow threaded arbor 109 inserted between stem 106 and wall 103, and at least one threading roller 110. When the threads 111 have been rolled, roller or rollers 110 are withdrawn laterally and the threaded article then spun off the arbor by a pair of spinning rollers as disclosed, for example, in U.S. Pat. No. 3,024,677 to George Y. Greiman et al. The free end portion of wall 102 is then bent back upon itself to provide the annularly reinforced end 112, and the connector is then applied to the hose in the same manner described with reference to FIG. 1A. Alternatively, reinforced end 112 can be formed during the drawing process.

Figure 4:
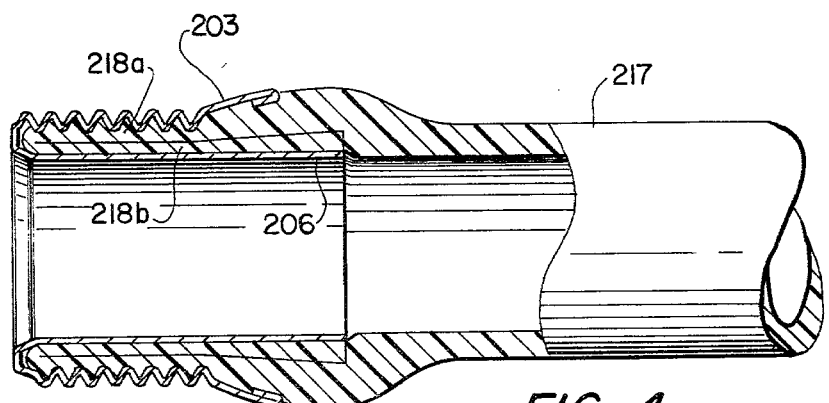
Figure 5:
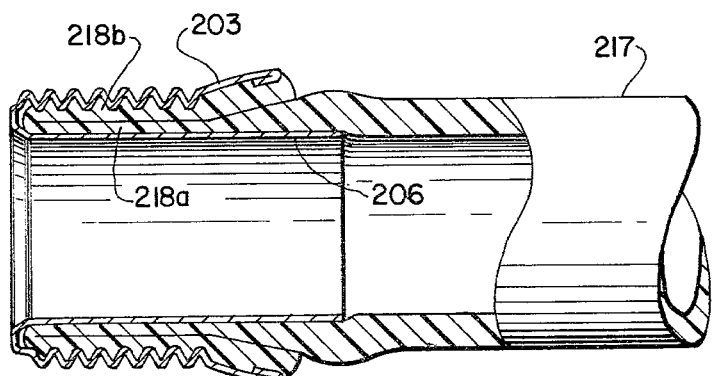

Since application of the connector to the hose requires that the end portion of the hose enclosed by the threaded shell be tightly clamped as a result of the expansion of the central stem, it is advantageous to increase the effective thickness of the end portion of the hose preparatory to attaching the connector. Thus, as seen in FIG. 4, the end portion of hose 217 can be turned inwardly and back upon itself to provide two layers 218a and 218b of the hose material. Alternatively, as seen in FIG. 5, the end portion of the hose can be turned outwardly and back upon itself to provide the two layers 218a and 218b. In both cases, the two layers 218a, 218b are clamped between the stem 206 and threaded wall 203 when the stem is expanded. Provision of the two layers of hose material in the manner illustrated by FIGS. 4 and 5 allows the invention to be applied to hoses of varying wall thickness without requiring that a different size of connector member be made for each hose of different wall thickness.

What is claimed is:

1. A male threaded hose connector in the form of an integral sheet metal piece comprising an annular outer wall;

a generally transverse annular end wall extending inwardly from one end portion of the outer wall; and an open-ended tubular stem extending from the end wall axially within and spaced concentrically from the outer wall; a major portion of the length of the outer wall being in the form of screw threads commencing at said one end portion, the screw threads presenting male thread crests at the outer surface of the wall and female thread crests at the inner surface of the wall, there being no portion of the outer wall between the screw threads and the end wall which has an outer diameter large enough to interfere with application to the male threaded connector of a female connector, the tubular stem extending for at least the axial length of said major portion.

2. A hose connector according to claim 1, wherein the annular end wall comprises a flat transverse annular outer portion, and a frustoconical inner portion which tapers away from said one end portion and joins the tubular stem.

3. As an article of manufacture, the combination of a length of hose having a free end portion formed of material which is flexible and compressible; and a male threaded connector secured to said free end portion, said connector being in the form of an integral sheet metal piece comprising an annular outer wall, a generally transverse annular end wall extending inwardly from one end portion of the outer wall, and a tubular stem extending from the end wall axially within and spaced concentrically from the outer wall, a major portion of the length of the outer wall being in the form of screw threads commencing at said one end portion, the screw threads presenting male thread crests at the outer surface of the wall and female thread crests at the inner surface of the wall;

said end portion of the hose extending within the annular space between the tubular stem and outer wall and being clamped therebetween with said female thread crests being embedded in the hose material of said end portion.

4. The article of manufacture defined in claim 3, wherein said end portion of the hose is bent back upon itself, whereby the portion of the outer wall which is in the form of screw threads is opposed by two thicknesses of hose material.

* * * * *